July 24, 1962
I. E. WIEGERS
3,045,700
PISTON SLIDE VALVE
Filed June 24, 1957
2 Sheets-Sheet 1
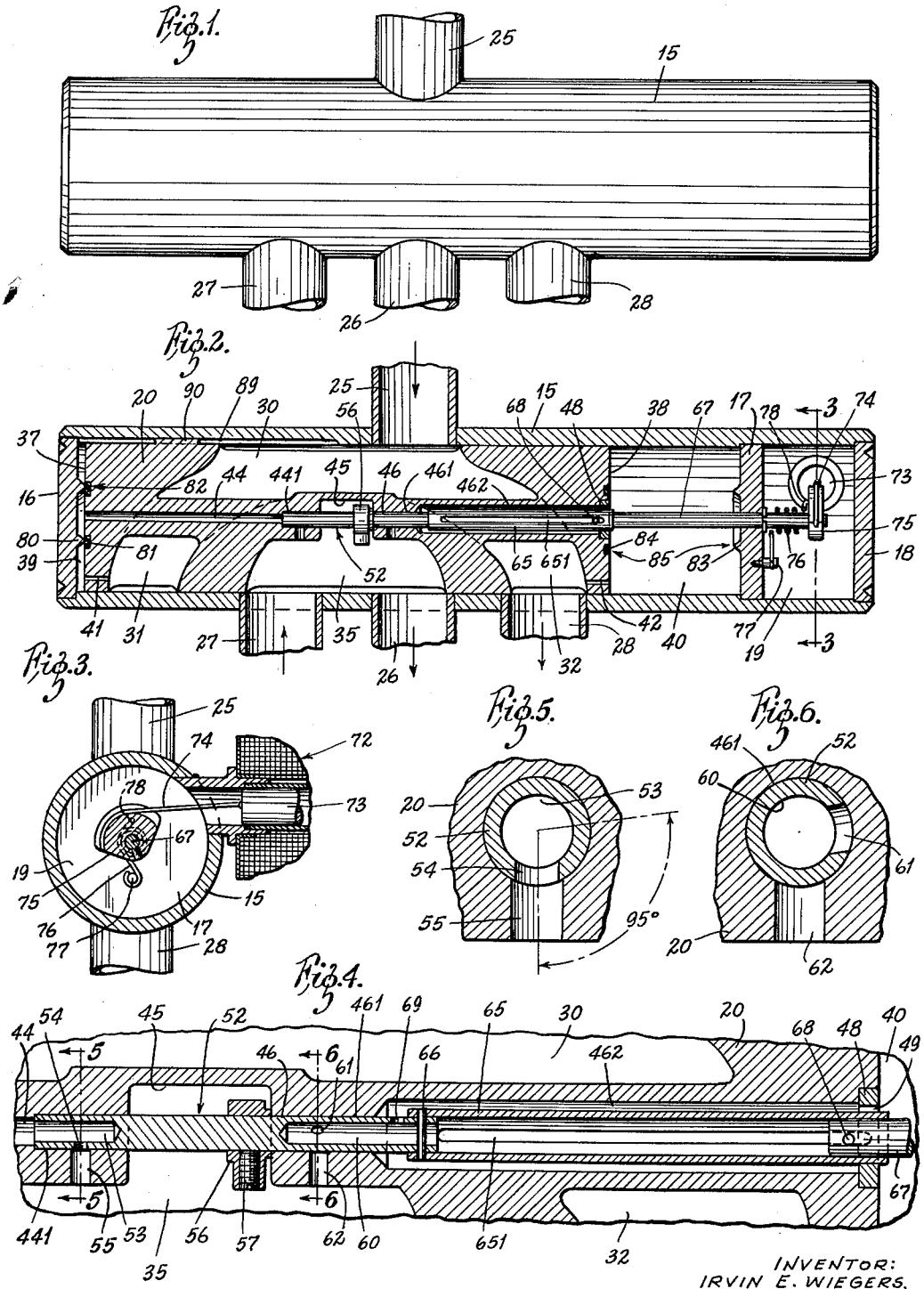
INVENTOR:
IRVIN E. WIEGERS,
BY Kingsland, Rogers & Ezell
ATTORNEYS

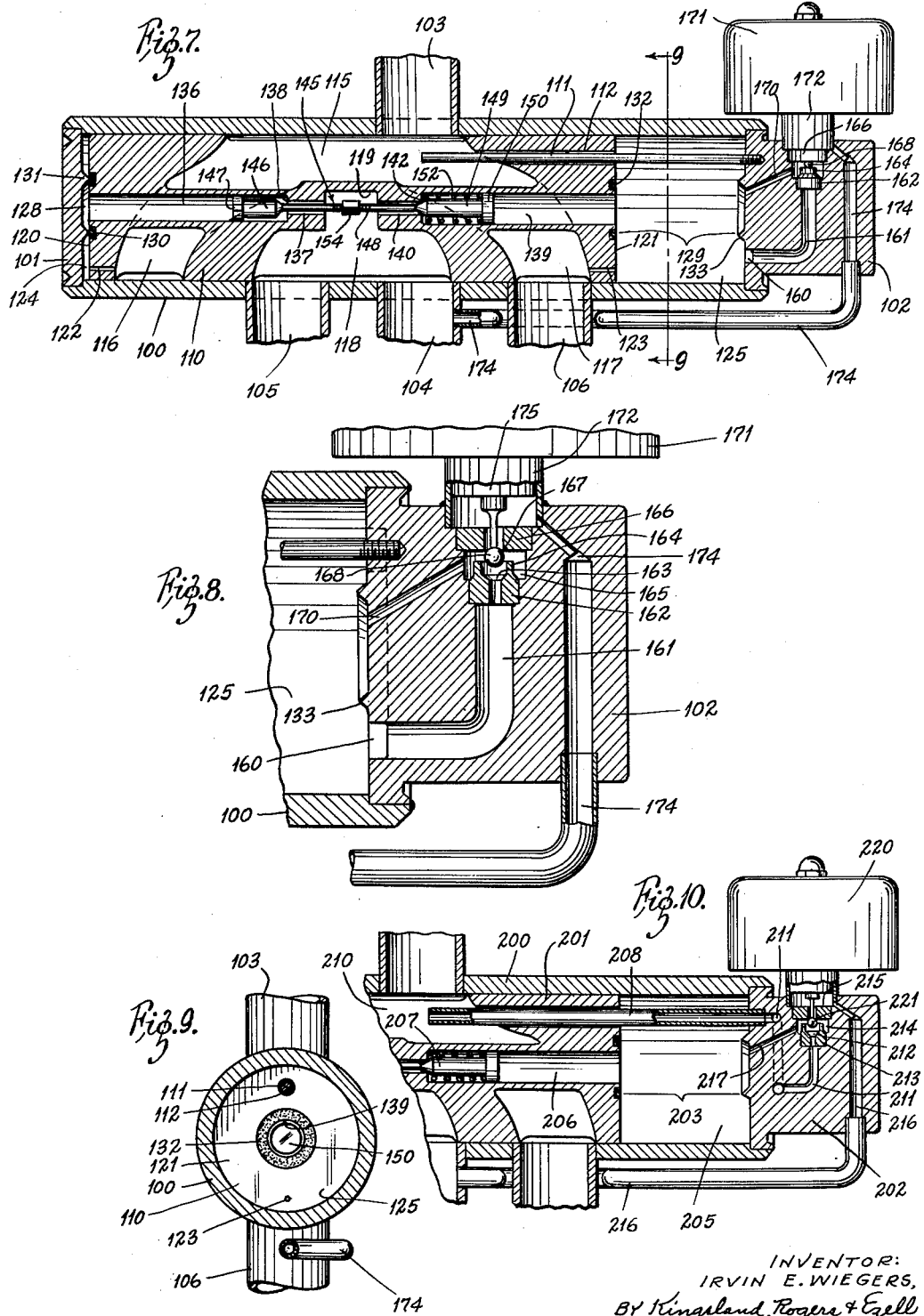

United States Patent Office 3,045,700
Patented July 24, 1962

3,045,700
PISTON SLIDE VALVE
Irvin E. Wiegers, St. Louis, Mo., assignor to Alco Valve Company, St. Louis, Mo., a corporation of Missouri
Filed June 24, 1957, Ser. No. 667,638
10 Claims. (Cl. 137—625.29)

The present invention relates to a four-way valve. In particular, it relates to a reversing valve of especial utility as a four-way valve though having features of more general use. It especially comprises a piston slide valve having high and low pressure passages, and valve means located in the piston slide for connecting and disconnecting the pressure chambers of the piston valve to one of the high or low pressure passages. In its more specific application the invention consists of a valve having a high-pressure inlet, a low-pressure outlet and two working lines, with a valve changing device, here in the form of a piston slide, adapted alternately to connect one working line to high-pressure and the other working line to low-pressure, and vice versa.

A particular use of this specific type of valve is in connection with reverse cycle refrigeration apparatus in which there are, in series, a compressor, a first condenser-evaporator coil, an expansion device, and a second evaporator-condenser coil, the latter being connected back into the low-pressure side of the compressor.

In such apparatus, the first coil may ordinarily be an outdoor coil for condensing the compressed refrigerant, and the second coil may be an inside coil for refrigerating the interior of an enclosure such as a room or other space. The reverse cycle apparatus can reverse the functioning of the two coils, making the indoor coil the condenser to heat the space and the outdoor coil the evaporator to absorb heat from the outside.

In the design of piston slide valves for the foregoing use, it is ordinarily desirable to operate them by pilot valve controls so that the full pressure of the high-pressure gas may be used to effect the movement of the valves. The latter is particularly advantageous because, in certain cases, the construction of the valves puts a considerable amount of loading on the movable member and some degree of force is required to produce the movement. Also, it is less expensive to build a valve in which the available fluid pressures produce the movements of the slide, and a much smaller controlling motor, such as a solenoid, is required because it need operate only a pilot valve.

However, in such power operated valves, in which pressure chambers are provided on opposite sides of the movable member, it has heretofore been the practice to provide either a three-way power operated pilot valve, or two, two-way valves, so that each pressure chamber can be individually pilot controlled. The foregoing requires additional mechanism and adds to the cost of operation and servicing.

A primary object of the invention is to provide a piston slide valve having opposite pressure chambers, passages through the slide valve itself for effecting pressure conditions in the pressure chambers and pilot valve means in the piston slide for controlling the passages. Another object is to provide a control valve means for effecting shifting of that valve means, the control valve being connected to the cylinder and directly or indirectly connected to the pilot valve means to operate the latter by direct or relayed action.

Another object of the present invention is to provide a four-way piston slide valve in which the control is obtained by a single, small solenoid control device or its equivalent. Another object is to provide such a valve in which the primary control is mounted on one end of the device, with a pilot valve mounted in the piston slide and operated in response to the primary control.

Other objects will appear from the description to follow.

In the drawings:
FIGURE 1 is a front elevation of the valve;
FIGURE 2 is a longitudinal diametrical section through the valve;
FIGURE 3 is a transverse section taken on the line 3—3 of FIGURE 2;
FIGURE 4 is an enlarged sectional view of the pilot valve mechanism;
FIGURE 5 is a transverse section on the line 5—5 of FIGURE 4;
FIGURE 6 is a transverse section taken on the line 6—6 of FIGURE 4;
FIGURE 7 is a longitudinal diametrical section through a valve embodying a modification of the invention;
FIGURE 8 is an enlarged sectional view of the right end of FIGURE 7 showing the pilot operating mechanism;
FIGURE 9 is a transverse section on the line 9—9 of FIGURE 7; and
FIGURE 10 is a view similar to FIGURE 7, showing a modification of the control valve arrangement.

Referring to FIGURES 1 to 4, the valve includes a cylinder 15 with cylinder heads 16 and 17. The head 17 is located inwardly from the end of the cylinder, and spaced inwardly from a closure 18, so that there is a pilot-actuating device chamber 19, between the cylinder head 17 and the end 18. The main valve includes a piston slide 20 that operates between the end closures 16 and 17.

The cylinder 15 has a first or high-pressure inlet 25, that passes through the cylinder wall. Preferably but not necessarily, it is midway between the heads 16 and 17. On the opposite side of the cylinder are a second or low-pressure outlet 26, and third and fourth connecting pipes 27 and 28 which may be designated as working line connections. The pipes 27 and 28 are on opposite sides of the pipe 26.

The piston slide 20 is in the form of a D-valve. It has a high-pressure passage 30 with an elongated upper end (as viewed in FIGURE 2) opening through the surface of the piston slide 20 so as to remain in registry with the first or inlet passage 25 throughout the movements of the piston slide 20 from the cylinder head 16 to the cylinder head 17. The passage 30 also extends downwardly in a U-shaped manner to provide extensions 31 and 32. The extension 31 as illustrated in FIGURE 2 is out of registry with any pipe. However, the extension 32 of the passage 30 is in registration with the working line 28. When the piston slide 20 moves all the way to the right, it will move the passage extension 32 away from the pipe 28 and will bring the passage extension 31 into registry with the pipe 27.

Between the extensions 31 and 32 of the high-pressure passage 30 there is a low-pressure passage 35 that is shown as connecting the low-pressure passage 26 with the working line 27. When the piston slide 20 moves to its right-hand extreme, the valve porting passage 25 will connect passages 26 and 28.

The piston slide 20 has piston head faces 37 and 38 on its opposite ends, that cooperate with the adjacent parts of the cylinder and the cylinder heads 16 and 17 to provide pressure chambers 39 and 40. When fluid pressure is introduced into one of these pressure chambers, it can move the piston slide 20 to one end or the other. To provide a constant supply of high-pressure fluid to the pressure chamber 39, the piston is provided with a bleeder passage 41 that always connects the extension 31 of the high-pressure passage 30 of the valve to the pressure chamber 39. In like fashion, the bleeder passage 42 constantly connects the other pressure chamber 40 with the extension 32 of the high-pressure passage 30 in the valve. Since the passage 30 is always connected to the high-pressure inlet 25, the bleeder passages 41 and 42 mean that the high-pressure in the inlet passage 25 is constantly admitted to both pressure chambers 39 and 40.

Pilot valve means is provided to selectively exhaust one or the other of the two pressure chambers 39 and 40. This pilot valve is mounted in the axis of the piston slide 20.

For the foregoing purpose the piston slide 20 has a passage 44 extending from its left end as illustrated in FIGURES 2 and 4, to a recess 45 in the upper part of the low-pressure valve passage 35. Coaxially with the foregoing passage 44, there is a passage 46 leading from the recess 45 to the pressure chamber 40.

It will be seen that the passage 44 is enlarged at its right-hand end as illustrated at 441 so as to provide a shoulder. The other passage 46 has its first portion 461 of the same diameter as the passage 441, and then has an enlarged portion 462 extending out through the face 38 of the right-hand end of the slide 20. A guide ring 48 having a port 49 is press-fitted into an enlargement at the right-hand end of the passage 46, for acting as a guide, as will appear. Reference to FIGURE 4 will show that the passage 44 continuously receives pressure from the pressure chamber 39, while the guide ring 48 continuously admits fluid through the port 49 from the pressure chamber 40 into the enlarged portion 462 of the space or bore 46.

A pilot valve, generally designated by the number 52, operates in the previously mentioned passages in the piston 20, as illustrated in FIGURES 2, 4, 5 and 6. Its left end fits within the larger recess 441 and abuts against the shoulder at the left end thereof. Its left end has a bore 53 therein and a port 54 through the wall of the bore. The port 54 is adapted to be moved into and out of registration with the lateral passage 55, when the valve 52 is oscillated about its longitudinal axis. This operation produces connection or disconnection between the central part of the pressure chamber 39 to the left of the main piston 20, and the low-pressure passage 35 of the main valve.

The valve 52 extends across the recess 45 of the low-pressure passage 35. Within that recess, there is a collar 56 attached to the valve 52 by a releasable setscrew 57. The collar is adjustably held against the right-hand surface of the recess 45 so that it acts with the shoulder at the left-hand end of the valve 52 to hold the valve firmly in place against longitudinal movement in either direction.

Where the valve 52 passes through the passage 461 and extends out into the enlargement 462, it is drilled to provide an axial bore 60. This bore has a port 61 that can be brought into and out of registry with the lateral passage 62 of the main valve, as illustrated in FIGURES 4 and 6. The bore 60 is normally in communication with the central part of the pressure chamber 40, as will be explained.

The end of the valve 52 is formed with a tubular extension 65 that may be attached to the main portion of the valve by a pin 66. The tube 65 extends to the right-hand surface 38 of the piston, but should not project very far therefrom lest it be forced into abutment with the partition 17 when the piston moves all the way to the right. This tube or sleeve 65 has bearing within the collar 48.

The tube 65 has opposite slots 651 extending substantially from one end to the other of it. An actuating torsion rod 67 has a cross pin 68 disposed within the two slots 66, the arrangement being such that the rod 67 may telescope within the sleeve 65, to accommodate endwise movements of the main piston slide 20 but may always apply an oscillating force to the sleeve and hence to the main portion of the valve 52. As heretofore noted, fluid pressure within the pressure chamber 40 may pass through the collar 48 and into the bore 60 of the main valve, there being a lateral port 69 to insure communication from the space 462 to the bore 60. Additionally, the tube 65 can conduct fluid through its slot 651 into the end of the bore, since that bore will not normally be entirely closed by the cross pin 66.

There is a primary operating or power means, in the form of rotating means for the valve, mounted in the operating chamber 19 to the right end of the cylinder 15. It includes a solenoid motor 72 attached to the chamber 19 and having a core 73 connected by a cable 74 to an arcuate pulley 75 fastened to the end of the torsion rod 67. A torsion spring 76 surrounds the end of the rod 67 that projects into the chamber 19. It has one end attached to the partition 17, as shown at 77, and the other end 78 attached to the arcuate pulley 75. The piston is normally maintained in the position illustrated, in which the pressure chamber 39 at the left end of the main piston slide 20 is exhausted, to the low-pressure passage 35, while the pressure chamber 40 at the right end of the main piston is closed off from the low pressure passage 35. When the solenoid 72 is energized, its core is drawn to the right in FIGURE 3, which twists the valve 52 to reverse the pressure conditions as will appear.

There are cut-off valves at the central part of each end of the main piston. To this end, the left cylinder head 16 has a valve ring 80 that can cooperate with a valve seat insert 81 on the end 37 of the piston, so that these two parts can form a valve that is generally indicated by the numeral 82. Similarly at the right-hand end, there is a valve ring 83 on the partition 17 and, a seating ring 84 in the surface 38 of the piston, the two of them forming a cut-off valve that generally is indicated by the numeral 85.

Appropriate means are provided to prevent rotation of the piston 20 within the cylinder, such as, for example, the interengaging groove 89 and ridge 90, appearing in FIGURE 2.

*Operation of the Valve of FIGURES 1–6*

It will be assumed, although it is not absolutely necessary, that the pipe 25 is connected to a source of high pressure fluid such as the high-pressure side of a compressor in such a refrigeration system as was previously mentioned. Similarly, it will be assumed that the pipe 26 is connected to the suction side of the compressor, that the pipe 27 is connected to the inside coil which, in the summer, is an evaporator coil and in the winter is a condenser coil; and that the pipe 28 is connected to the outside coil.

If the valve slide 20 is in the position illustrated, high-pressure from the compressor passes from the line 25 at all times into the high-pressure passage 30 and its branches 31 and 32. Such high pressure at all times is bled into the pressure chambers 39 and 40 through the respective bleeder passages 41 and 42. However, the high pressure cannot escape from the outer ring of the pressure chamber 39 because the cut-off valve 82 is closed under the illustrated conditions. The pressure in the other chamber 40 is prevented from escaping even though the valve 85 is open, because the pilot valve 52 is in the position illustrated in FIGURE 6 in which the bore 60 is cut off from the lateral passage 62 by virtue of the previous rotation of the port 61 away from registry with the passage 62. Consequently, pressure is held within the pressure chamber 40.

Since the effective pressure area on the right-hand end face 38 of the piston is greater than that on the left-hand end face 39, owing to the closure of the valve 82 at the left-hand end, the pressure will hold the main piston 20 to the left under the conditions indicated.

Under such circumstances, the high pressure will be conducted from the pipe 25 to the high-pressure passage 30, to the leg 32 of the high pressure passage, and out the pipe 28. Assuming that the pipe 28 is connected to an outside coil, that coil will act as a condenser. In the typical refrigeration system, the fluid will then pass from the condenser through an expansion device and into an evaporator, which is the inside coil, so that the fluid can refrigerate the enclosure. Thence, it returns by the pipe 27, which is now connected by the low pressure passage 35 to the suction line 26, and back to the compressor.

Of course, other uses are readily made of the valve, but the illustrated one is well known and therefore can demonstrate the utility of the device.

The foregoing conditions will continue until it is desired to put the inside coil on a heating cycle. The change is made by actuating the pilot valve. This may be done manually or by power. Here it will be assumed that some control will energize the solenoid 72 so that the core 73 will be pulled to the right in FIGURE 3, thereby twisting the torsion rod 67 in a clockwise direction, viewed in FIGURE 3. This action will disconnect the port 54 from the passage 55, thereby cutting off the exhaust of the left-hand pressure chamber 39; and it will connect the port 61 with the passage 62, thereby connecting the pressure chamber 40 to the exhaust, or low pressure, line. Since there is a constant bleeder flow of high pressure fluid to both pressure chambers (and the exhaust passages provide freer flow than the bleeder passages), the foregoing action of the pilot valve will permit the pressure to build up in the pressure chamber 39, while it is exhausted from the pressure chamber 40.

The outer ring area of the pressure chamber 39 is sufficiently great to cause the valve slide 20 to be moved to the right under the circumstances given. As soon as the valve 82 is opened, the entire left-hand end of the piston becomes available as pressure receiving area. When the piston slide 20 moves entirely to the right, the valve 85 is closed, and thereafter further bleed from the high-pressure side to the low-pressure side through the pressure chamber 40 will be prevented by this valve.

The foregoing condition will exist so long as the pilot valve remains in the clockwise position. As soon as it is moved counterclockwise to its original position, the conditions will be reversed and the piston slide 20 will move again to the left.

With this type of operation of the pilot valve, there is virtually no load on that valve at all. Hence, a very small motor, such as the solenoid 72, may be employed. Also, the operating mechanism takes a minimum of space because so much of it is contained within the limits of the piston slide itself. The passage means for the pressure chambers, including the parts comprising the bleeder passages 41 and 42, and the parts comprising the exhaust passages 44 and 46, are in the slide. The pilot valve means is also contained in the slide. Its operating means is mounted on the end of the cylinder, for direct or indirect connection to operate the pilot valve. The exhaust passages also enter through the piston heads within the cut-off valve rings.

It should not be assumed that the operation and construction require the bleeder passages to be connected to the high-pressure side and the so-called exhaust passages to the flow pressure side. In reversing piston slide valves and the like, it is sometimes better to interpose the valving control on the high-pressure side, and other times on the low side. It is fairly obvious that the valve would operate with the opening 26 connected to high pressure and opening 25 to low.

*The Embodiment of FIGURES 7–9*

In FIGURES 7–9, there is a modification of the valve arrangement which is similar in general pattern to the one previously described, except that the pilot valve is indirectly operated by the control valve. The valve casing or cylinder 100 is closed by opposite cylinder heads 101 and 102. There is a high-pressure inlet 103 mounted through the wall of the cylinder midway between the two heads, and a similarly mounted low pressure outlet 104 that is illustrated as being 180° from the inlet 103.

There are two working lines 105 and 106, that are adapted to be alternately connected one to the high and the other to the low-pressure pipes 103 and 104, and vice versa, as will appear.

There is a piston slide 110 that is movable from end to end of the cylinder 100. The piston slide 110 is kept from rotating within the cylinder about their common axis by a rod 111 that slides within a hole 112 in the piston slide and is attached to the cylinder head 102.

The piston slide 110 has a high pressure passage 115, of U-shape, with a leg 116 that is adapted to be moved in and out of registry with the passage 105, and a leg 117 that is adapted to be moved in and out of registry with the working line 106. Similarly, there is a low pressure passage 118 that is adapted to connect the suction line 104 with either the line 105 or the line 106. There is an extension 119 of the low-pressure passage 118, that opens across the axis of the piston for a purpose to appear.

The piston slide has a pressure face 120 at the left and 121 at the right, and there are high-pressure bleeder passages 122 and 123 that constantly connect the high-pressure passages 115, 116 and 117 with the pressure chambers 124 and 125 at opposite ends of the cylinder. There is a cut-off valve 128 for the left pressure chamber 124 and a cut-off valve 129 for the right pressure chamber 125. As illustrated, the valve 128 includes a projecting valve ring 131 on the head 101 and a cooperating softer valve seat 130 inset into the face 120 of the piston. The valve 129 is of like construction and includes a projecting valve ring 133 on the head 102 and a cooperating softer valve seat 132 inset into the face 121 of the piston. In the position illustrated in FIGURE 7, the valve 128 is closed, while the valve 129 is open.

There are aligned holes through the piston from end to end, opening through the two faces 120 and 121 within the rings of the valves 128 and 129. The left-hand end of the piston slide 110 has a passage 136 opening through the face 120 and having a reduced portion 137 that provides a valve seat 138 at the shoulder at its left end. The reduced portion 137 opens into the extension 119 of the low pressure recess 118 in the main piston slide 110.

At the other end, the piston slide 110 has a hole 139 extending through the piston face 121. This hose has a reduced continuation 140 opening into the extension 119 of the low-pressure passage 118, and providing a valve seat shoulder 142.

It can be seen that the passages that may generally be indicated as 136 and 139, respectively, connect the inner portions of the respective pressure chambers 124 and 125 with the low-pressure passage 118, which is at all times connected to the low-pressure outlet pipe 104. The two passages 136 and 139 are, however, regulated by pilot valve means. This valve is generally indicated at 145 and comprises a left-hand valve element 146 that has a non-circular head 147 adapted to guide the valve within the passage 136 without shutting off that passage. The valve 146 is adapted to seat against the valve seat 138, although it is removed from that seat in the illustration of FIGURE 7 so that the inner part of the pressure chamber 124 is exhausted.

A valve stem 148 connects the valve 146 to a valve 149 within the bore 139. This valve 146 has a piston head 150 that responds to elevated pressure conditions within the bore 139 to cause the valve to seat upon the valve seat 142. A coil spring 152 surrounds the valve 149 and normally urges it into its open position with respect to the seat 142. The valve stem 148 is formed in two pieces joined by a turnbuckle 154 by which one can adjust the length thereof so that the valves seat properly.

The pilot valve 145 in this case is indirectly, rather than directly operated by the power means and control valve. To this end, a solenoid-operated three-way valve is mounted in the right-hand cylinder head 102. This cylinder head has a substantially completely circular recess 160 at its inner surface outside the valve ring 133. A passage 161 connects the recess 160 to a screw machine part 162 that has a ball valve seat 163 surrounded by a retaining cup or flange 164. The result is that the passage 161 opens through the valve seat 163 into a valve chamber 165. The upper end of the valve chamber is closed by another centrally ported fitting 166 that has a valve seat 167 spaced from but aligned with the valve seat 163. A ball valve 168 is retained within the valve chamber and within the flange 164, but can cooperate with both valve seats 163 and 167.

A somewhat smaller passage 170 extends from within the ring 133 of the valve 129 to the chamber 165.

A solenoid 171 is mounted on the cylinder head 102 and has a lower tubular portion 172 that projects into and is secured within the head. The fitting 166 has its center passage opening into the bottom of the tube 172. The only outlet from the tube 172 is a passage 174 that connects ultimately to the suction side pipe 104.

The core of the solenoid is illustrated at 175, and it moves above the ball valve 168. When the solenoid is deenergized, the core drops and the ball valve 168 is closed on the seat 163. When, however, the solenoid is energized the ball valve is free, and upon rising, will open the valve seat 163, but will close against the valve seat 167.

*Operation of the Embodiment of FIGURES 7–9*

Assuming for illustration, that the valve is connected into a system such as a reverse cycle refrigeration system, the pipe 103 is connected to the outlet or high pressure side of the compressor. The pipe 104 is connected to the inlet or low pressure side of the compressor. The pipe 106 is connected to the outside coil, which will act as a condenser. That coil will be connected through an expansion device to an inside coil which is acting as an evaporator, which, in turn, is connected to the pipe 105; and, with the valve in the position illustrated, the pipe 105 is connected back to the suction line 104. Under such circumstances, the flow of the refrigerant fluid would be from the pipe 103, through the passage 115, the pipe 106, the condenser coil, the expansion device, the evaporator coil, the pipe 105, the passage 118, the suction line 104, back to the compressor.

High-pressure is constantly delivered to the two legs 116 and 117 of the high-pressure valve passage 115 in the main piston slide 110, regardless of the position of the piston slide 110. Similarly, it is always supplied through the constrictions 122 and 123 to the two pressure chambers 124 and 125. As illustrated, with the piston 110 completely to the left, the valve 128 is closed and consequently the pressure from the outer ring of the pressure chamber 124 is closed off, and no bleed of high-pressure fluid to the suction line 104 can occur. The inner or center part of the pressure chamber, however, can exhaust through the passage 136 past the head 147 of the valve 146 and the valve passage 138, into the low pressure passage 118 of the piston slide, and to the low-pressure pipe 104. This permits the piston to remain to the left. In the meanwhile, the pressure delivered through the bleeder passage 123 to the piston chamber 125 is acting upon the piston face 121 and the valve head 150 of the pilot valve 145 to maintain the valve 145 to the left, closing the valve 149 against the seat 142 and preventing the exhaust of high pressure through the passage 139. As will appear, the high pressure in the chamber 125 is not otherwise permitted to escape, and thereby acts upon the full right end of the piston slide 110 and holds it to the left as illustrated.

At this time, the high pressure can act also in the ring groove 160, the passage 161, the chamber 165 and the passage 170 in the cylinder head 102 (see FIGURE 8). The valve 168 is in its elevated position, a position in which it is held when the solenoid core is raised, in one of its conditions of operation.

It is well known that a solenoid can be operated either to elevate its core or to lower it when electrically energized. A spring normally is used to produce motion in the other directoin, so as to make the operation independent of the mounting position, and adequately strong to insure operation of the valve. The choice between whether energization will lift or lower the valve is ordinarily only whether in its use the valve will stay in its upper or its lower position most of the time, in order to minimize the period of electrical energization.

In order to shift the main valve, or piston slide 110, the pilot valve 145 is operated. This is here accomplished by the solenoid power means. Assuming that the solenoid is operated to lower the valve 168 so that it opens the valve seat 167 and closes the valve seat 163, there follows an exhaust of the pressure in the pressure chamber 125. The passage 170 is exhausted past the valve 168, the valve seat 167, and out the passage 174 to the low-pressure pipe 104.

Also, as soon as the piston chamber 125 is opened to exhaust or low pressure, the pressure on the head 150 of the pilot valve 145 is relieved and the spring 152 moves that valve to the right. This closes the valve 146 against the seat 138 and it opens the valve 149 from the seat 142. The closure of the valve 146 prevents bleed-off of pressure from the chamber 124.

When the foregoing occurs, the high pressure which is constantly admitted to the pressure chamber 124 acts therein to move the piston 110 to the right. In this action, the initial high pressure is upon the outer ring of the piston face 120 outside the valve 128. Since the entire right face 121 of the piston is at low pressure, the foregoing is sufficient to initiate movement of the piston slide 110 to the right. As soon as it opens the valve 128, the pressure connects on the entire left end of the piston slide 110.

When the piston reaches its full right position, it closes the valve 129; but so long as the ball valve 168 is in its lower position the passage 170 can continue to act as an exhaust for the inner circle of the pressure chamber 125. Since the high pressure acts over the entire area of the left end of the piston, the build-up of pressure on the outer ring of the right end 121 of the piston is insufficient to displace the piston to the left. Therefore, the piston 110 will move to the full right position and will remain there so long as the ball valve 168 remains in its lower position.

With the piston entirely to the right, the connections made by the main valve, or piston slide 110, are reversed. The high pressure from the pipe 103 then moves through the passage 115 and its left-hand leg 116 to the pipe 105, and thence to the inside coil which now must act as a condenser supplying heat to the enclosure. From the inside coil, it passes through the expansion device to the outside coil, which now acts as an evaporator through which heat is absorbed from the ambient atmosphere or surrounding medium. From the outside coil, the flow continues through the pipe 106 which is now connected by the low pressure passage 118 of the main piston slide 110 to the suction pipe 104 and back to the compressor.

The foregoing conditions will continue until the valve 168 is again lifted by operation of the solenoid 171. When the solenoid core 175 is lifted, the high pressure in the outer ring of the pressure chamber, constantly fed by the bleeder passage 123, blows the ball 168 off its seat and up against the seat 167, whereon it is held by the pressure differences. When the ball valve 168 is thus lifted, it opens from the valve seat 163, so that high pressure then flows from the outer ring of the chamber 125, through the passage 161, past the valve seat 163, into the chamber 165, and by way of the passage 170 into the inner or central part of the piston. Thence it flows into the passage 139 and acts against the head 150 of the pilot valve 145. When it builds up against this head to a sufficient degree, it compresses the spring and moves the valve to the left until it is stopped by engagement against the seat 142. This will, however, move the valve 146 off of its seat, thereby exhausting the pressure from the pressure chamber 124. The combination of these two actions is to shut off the exhaust from the chamber 125 so that pressure builds up in it to move the piston to the left, while the opposite pressure chamber 124 is exhausted to permit the piston 110 to move to the left. The piston movement continues until the valve 128 is closed by the full leftward movement of the piston. Thereafter the bleed of the pressure through the passage 122 cannot escape because of the valve 128.

The valve 149 is not requried to seat on the seat 142, other than to limit leftward movement of the valve, provided the piston head 150 is reasonably tight. If the piston is loose, the valve 149 can eliminate waste of pressure and fluid flow. When the valve is used, the high fluid pressure acting on the effective valve seat area must be enough to overcome the spring 152.

The foregoing represents a complete cycle of operation of the valve. With this valve, the pilot valve and the exhaust passages are on the central axis of the piston. It is of great advantage from the standpoints of installation and cost, to provide these parts within the piston slide itself. While they need not be at the central axis, it is convenient to place them there. If moved from the axial position, the two cut-off valves 128 and 129 must be adjusted so that they cut off the passages from the rest of the pressure chambers. In this embodiment, the solenoid does not directly operate the pilot pressure valve, but it indirectly operates it through control of fluid. The unit occupies little more space, if any, than that of the other embodiments, and it retains the advantages of the pilot valve contained within the piston, the capability of operation by a single solenoid coil, the prevention of continuous bleed-off into the exhaust passages, the D-valve construction, and the like. Of course, some of the features may be used without mounting the pilot valve within the piston, or with more than a single solenoid, but the overall design as illustrated is felt to be superior to such modifications.

FIGURE 10 illustrates a variant of FIGURES 7-9, in which the high-pressure source is controlled by the solenoid control valve, instead of a bleed line. The parts not illustrated are the same as in FIGURES 7-9.

In FIGURE 10, the cylinder 200 receives the piston 201 as before. The head 202 closes the cylinder, and has the cut-off valve 203 as before. The cylinder 200 and the piston slide 201 form the pressure chamber 205. The piston has the exhaust passage 206, and the pressure-responsive valve 207 that corresponds to the valve 149.

In FIGURE 10, the guide 208, which corresponds to the guide 111, is tubular, so as to act as a conduit for fluid pressure from the high pressure passage 210 of the slide 201. The tube connects with a passage 211 in the head 202. The passage 211 connects to the lower valve seat 212 on the flanged fitting 213, in the valve chamber 214. The upper valve seat 215, as before, connects between the chamber 214 and the exhaust line 216, corresponding to the conduit 174. A passage 217 leads from within the valve 203 to the chamber 214. The solenoid 220 controls the ball valve 221, as before.

The cycle of this embodiment is the same as for FIGURES 7-9. However, high pressure is not admitted to the pressure chamber 205 except when the solenoid 220 elevates its core, and enables the high pressure delivered directly from the passage 210 to lift the ball valve 221 and then flow via the passage 217 into the pressure chamber. (This embodiment is useful where bleed-off of the high pressure is particularly to be avoided.)

This embodiment eliminates the bleed hole 123 shown in FIGURE 7 and makes operation of the valve assembly 207 more positive and rapid and cannot become inoperative by stoppage of the bleed hole.

What is claimed is:
1. In a valve: a closed-ended cylinder; a slide movable therein back and forth along the axis thereof; a high pressure inlet entering the cylinder between its ends, a low-pressure outlet entering the cylinder between its ends and spaced from the inlet; a pair of working line connections entering the cylinder on opposite sides of the low-pressure outlet; the slide having a U-shaped high-pressure passage connected constantly to the high pressure inlet, and having each leg adapted for alternate connection and disconnection with the adjacent working line connection as the slide assumes its opposite positions; the slide also having a low-pressure passage constantly connected to the outlet and alternately connected to the two working lines as the slide assumes its opposite positions, the slide passages thus providing connection from the inlet to the first working line connection and from the second working line connection to the outlet, or alternately providing connection from the inlet to the second working line connection and from the first working line connection to the outlet; the cylinder and slide providing opposite pressure chambers at the ends of the cylinder; restrictive passages constantly open from the high pressure passage of the valve through the ends of the slide to the two pressure chambers; passages along the axis of the slide, extending through the ends thereof, the low pressure slide passage intersecting the axial passages; means to connect and disconnect the pressure chambers alternatively to the low pressure passage, including a pilot valve device extending into said axial passages, the pilot valve device having means to open and to close communication from at least one of the pressure chambers to the low pressure passage, sufficiently unrestricted to relieve the pressure therein despite the restricted inflow thereto; cut-off valves, one in each pressure chamber, each comprising a circular valve ring element and a circular valve seat element, one element on each cylinder head and the other element on the slide, so that movement of the slide to either end will close the corresponding valve elements together, the two axial passages in the piston opening through the slide inside the circular valve elements, whereas the restrictive passages are located outside the ring elements; and means including a solenoid device for effecting the operating movements of the pilot valve.

2. In a valve: a closed-ended cylinder; a slide movable therein back and forth along the axis thereof; a first opening entering the cylinder between its ends, a second opening entering the cylinder between its ends and spaced from the first opening; a pair of working line connections entering the cylinder on opposite sides of the second opening; the slide having a first passage connected constantly to the first opening, adapted for alternate connection and disconnection with the adjacent working line connection as the slide assumes its opposite positions; the slide also having an additional passage constantly connected to the second opening and alternately connected to the two working lines as the slide assumes its opposite positions, the slide passages thus providing connection from the first opening to the first working line connection and from the second working line connection to the second opening, or alternately providing connection from the first opening to the second working line connection and from the first working line connection to the second opening; the cylinder and slide providing opposite pressure chambers at the ends of the cylinder; restrictive passages constantly open from the first opening of the valve to the two pressure chambers; passages along the axis of the slide, extending through the ends thereof, the second opening intersecting the axial passages; means to connect and disconnect the pressure chambers alternatively to the second opening, including a pilot valve device extending into said axial passages, the pilot valve device having means to open and to close communication from at least one of the pressure chambers to the second opening, sufficiently unrestricted to relieve the pressure therein despite the restricted inflow thereto; cut-off valves, one in each pressure chamber, each comprising a circular valve ring element and a circular valve seat element, one element on each cylinder head and the other element on the slide, so that movement of the slide to either end will close the corresponding valve elements together, the two axial passages in the piston opening through the slide inside the circular valve elements, whereas the restrictive passages are located outside the ring elements; and means including a solenoid device for effecting the operating movements of the pilot valve.

3. In a valve: a closed-ended cylinder; a first opening entering the cylinder between its ends; a second opening entering the cylinder between its ends and spaced from the first opening; a pair of working ports opening into the cylinder on opposite sides of the second opening; a piston slide operable back and forth within the cylinder; means for selectively communicating the first opening with the one or the other of said work ports comprising a passage through said slide in constant communication with said first opening; means in said slide for communicating the second opening with that work passage which is not in communication with said first passage, each end of the slide cooperating with the adjacent end of the cylinder to define a pressure chamber; flow passage means between the first opening and each pressure chamber and flow passage means between each pressure chamber and the second opening; at least one of the flow passage means passing through the slide and opening through each end of the slide; a pilot valve in the latter flow passage means, and means for opening and closing the pilot valve to effect movement of the valve.

4. The valve of claim 3 wherein: there is a cut-off valve comprising a ringed valve closure element and a valve seat element, on the piston and on the cylinder, brought together when the piston reaches the end of its stroke and leaving an open space therewithin, one portion of the flow-passage means opening within said open space.

5. The valve of claim 3: wherein the means for opening and closing the pilot valve includes an articulated mechanical connection connected to the pilot valve adapted to be connected to a motor device.

6. The valve of claim 5, wherein: the mechanical connection includes a projection on the valve extending through a closed end of the cylinder head, and a device connected to the projection adapted to be connected to a motor device.

7. The valve of claim 5 wherein: the pilot valve is opened and closed by being oscillated; and mechanism connected to the valve to effect arcuate movement thereof adapted to be connected to a motor device.

8. The valve of claim 7 wherein: spring means is connected to the pilot valve to operate it in one direction.

9. The valve of claim 5 wherein: the mechanical connection includes two elongated elements, slidably but non-rotatably connected together, so that they may maintain connection with the pilot valve and are adapted to remain connected to a motor device during movement of the slide.

10. The valve of claim 3 wherein the pilot valve includes a valve element disposed in the flow-passage portion of each chamber, the valves being connected together so that one is opened by the movement that closes the other, and vice versa.

References Cited in the file of this patent

UNITED STATES PATENTS

| | | |
|---|---|---|
| 393,596 | Westinghouse | Nov. 27, 1888 |
| 518,026 | Drewett | Apr. 10, 1894 |
| 964,866 | Jenner | July 19, 1910 |
| 1,119,640 | Roettger | Dec. 1, 1914 |
| 2,355,434 | Harter | Aug. 8, 1944 |
| 2,526,709 | Tait | Oct. 24, 1950 |
| 2,616,449 | Maha | Nov. 4, 1952 |
| 2,709,421 | Avery | May 31, 1955 |

FOREIGN PATENTS

| | | |
|---|---|---|
| 802,298 | Germany | Feb. 8, 1951 |
| 875,179 | Germany | Apr. 30, 1953 |
| 1,071,554 | France | Mar. 3, 1954 |